United States Patent [19]

Stueven

[11] Patent Number: 5,222,471

[45] Date of Patent: Jun. 29, 1993

[54] EMISSION CONTROL SYSTEM FOR AN INTERNAL COMBUSTION ENGINE

[75] Inventor: Jeffrey S. Stueven, Howards Grove, Wis.

[73] Assignee: Kohler Co., Kohler, Wis.

[21] Appl. No.: 947,246

[22] Filed: Sep. 18, 1992

[51] Int. Cl.⁵ .................. F02D 9/10; F02D 41/14
[52] U.S. Cl. .................. 123/695; 123/399; 123/688
[58] Field of Search .............. 123/399, 672, 688, 694, 123/695

[56] References Cited

U.S. PATENT DOCUMENTS

| | | | |
|---|---|---|---|
| 4,171,690 | 10/1979 | Hosaka et al. | 123/694 |
| 4,178,883 | 12/1979 | Herth | 123/695 X |
| 4,204,482 | 5/1980 | Harada et al. | 123/694 |
| 4,363,305 | 12/1982 | Ohgami et al. | 123/694 X |
| 4,364,227 | 12/1982 | Yoshida et al. | 123/695 X |
| 4,402,291 | 9/1983 | Aono | 123/694 X |
| 4,430,979 | 2/1984 | Shikata | 123/688 X |
| 4,601,273 | 7/1986 | Kitahara et al. | 123/695 X |
| 5,033,433 | 7/1991 | Churchill et al. | 123/399 X |

Primary Examiner—Willis R. Wolfe
Attorney, Agent, or Firm—Quarles & Brady

[57] ABSTRACT

A system for controlling the air/fuel ratio input to a small engine measures the oxygen level in the engine's exhaust and compares it with a reference level. A stepper motor controls the air/fuel ratio and it is advanced one step each time a clock pulse is produced in a direction determined by the level of exhaust oxygen. A fault detector circuit stops the engine if the sensed oxygen level is outside a preset range for more than a preset time interval.

8 Claims, 2 Drawing Sheets

EMISSION CONTROL SYSTEM FOR AN INTERNAL COMBUSTION ENGINE

BACKGROUND OF THE INVENTION

The field of the invention is small engines and systems for controlling the emissions from such engines.

Various methods are used to control the emission of detrimental engine exhaust constituents such as nitrogen oxides, carbon monoxide and hydrocarbons. One method employs an oxygen sensor in the engine exhaust to measure the oxygen level and develop a control signal which operates a valve that effects the air/fuel ratio input to the engine. If the air/fuel mixture is too rich, excessive carbon monoxide and hydrocarbons will be emitted and the exhaust oxygen will be low. On the other hand, if the air/fuel mixture is too lean, engine power will be reduced.

Many systems have been developed for controlling the air/fuel ratio as a function of exhaust gases. Most have been developed for use on automobile engines which have on-board computers that control many functions. Typically, the analog signal produced by the oxygen sensor is digitized and input to the computer. The computer performs a number of calculations and outputs a digital control signal which is converted to analog form and applied to a motor which controls a carburetor or fuel injector valve.

While many highly sophisticated systems have been developed for automobiles, these are not suitable for use on small engines. It can be appreciated that the initial cost of an automobile engine and the maintenance which it receives is vastly different than a lawn mower engine. For economic reasons it is not possible to use digital computers and the associated support circuitry on small engines. Accordingly, purely analog circuits have been employed on small engines and because of cost constraints and the sensitivity of analog solutions to temperature and age, these analog circuits are very limited in their capability.

SUMMARY OF THE INVENTION

The present invention is a system for controlling the air/fuel mixture on an internal combustion engine with a stepper motor and as a function of a sensed exhaust gas. It is particularly suited for small engines because of its cost effectiveness and maintainability. More particularly, the control system includes a sensor which measures an exhaust gas and produces an analog signal indicative of the level of that gas; a comparator receives a reference level signal and compares it with the analog signal to produce a first logic level output if the reference signal exceeds the analog signal and a second logic level output if the reference signal is less than the analog signal; a flip-flop which stores the logic level output of the comparator in response to each pulse received from a clock; a stepper motor control connected to the flip-flop and being operable to advance the stepper motor in the direction indicated by the logic level stored in the flip-flop and at the rate indicated by pulses received from the clock.

A general object of the invention is to provide a low cost, reliable emissions control system for a small engine. The stepper motor may be connected to control a valve in a carburetor or fuel injector and it alters the air/fuel mixture by a discrete amount at each clock pulse. The stepper motor advances until the proper amount of gas is sensed in the exhaust, and then it toggles back and forth at the proper setting during steady state operation.

Another aspect of the invention is a cost effective fault detector which indicates if the emissions control system is operating properly. The fault detector includes a second comparator means which receives the analog signal and produces a first logic level signal if the analog signal is within a preset range and produces a second logic level signal if it outside the preset range, and a watch dog timer connected to the second comparator and being operable to produce a fault indicate signal if the second logic level signal is produced for more than a preset time interval. The fault indicate signal may energize a light to notify the operator that the engine is running too rich or too lean and it may be used to shut down the engine automatically.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
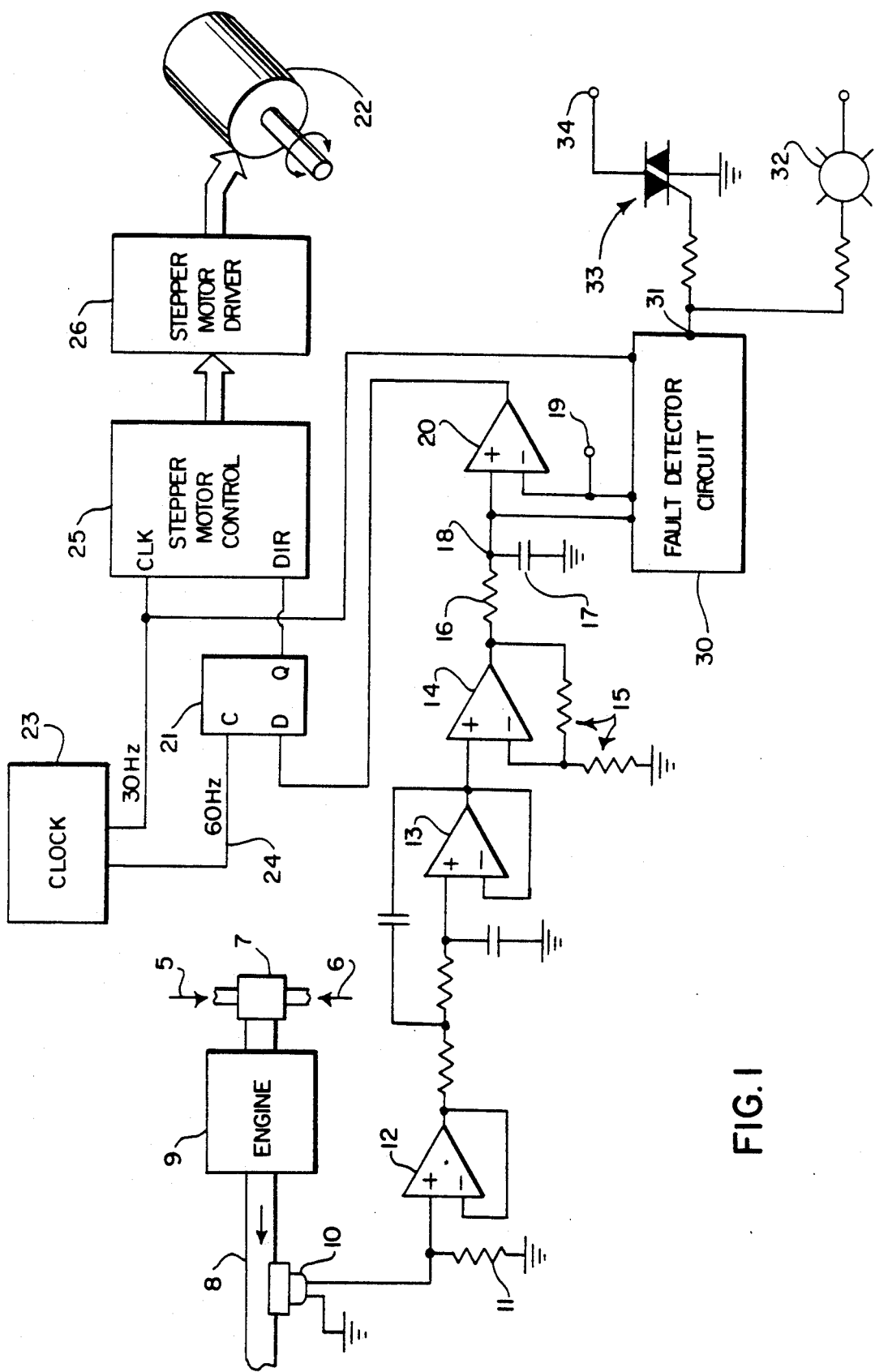
FIG. 1 is a schematic diagram of the preferred emission control system which incorporates the present invention.

The emission control system is shown in FIG. 1 and includes an oxygen sensor 10 which mounts to the exhaust manifold 8 of a small engine 9, and which produces an analog signal across a reference resistor 11. The analog signal indicates the amount of oxygen in the exhaust of an internal combustion engine 9, which receives an air/fuel mixture from a valve 7. A sensor such as part number 25106073 manufactured by AC Spark Plug Division of General Motors, may be used for this purpose and it produces a voltage ranging from 0 to 1,000 millivolts applied to a buffer circuit 12. A low output voltage indicates lean operation (more fuel required), and a high voltage indicates rich engine operation (less fuel required). During engine start-up, when the oxygen sensor 10 is inactive, resistor 11 pulls the input low to simulate lean operation. Consequently, additional fuel is added to provide good startability. The buffer output signal is applied to a low-pass filter formed around operational amplifier 13 and having a cut off frequency which is high enough not to impair the frequency response of the oxygen sensor 10. This filters out any high frequency noise components prior to the amplification of the oxygen signal by an operational amplifier 14. Resistors 15 are connected in a well known manner to amplifier 14 and are selected to provide adequate gain.

The filtered and amplified oxygen signal is averaged. This is accomplished by resistor 16 and capacitor 17. The resister has a value of 330K ohms and the capacitor has a value of 0.47 microforads. Together they form an R-C circuit which produces an oxygen level signal at 18 that averages the level indicated by oxygen sensor 10.

This oxygen level signal 18 indicates how the engine is running. When it is low, the engine is running rich and the emissions of carbon monoxide (CO) are high. On the other hand, when this signal is high the engine is running lean and may be losing power. The present invention controls the amount of fuel intake 6 by operating the valve 7. The valve 7 may be part of a carburetor or a fuel injector, or a combination of both.

The air/fuel ratio input to the engine is controlled by comparing the oxygen level signal 18 with a reference level signal applied at input 19. The reference level signal is a dc voltage which can be set to run the engine at various air/fuel ratios, ranging from 0.2% to 0.8% CO emission. This set point is adjusted to optimizes engine and catalyst performance. The oxygen level signal 18 and the reference level signal 19 are applied to the inputs of a comparator 20. The output of comparator 20 toggles between a logic low voltage indicating the oxygen level is below the reference level and a logic high voltage indicating the oxygen level is above the reference level.

This logic level signal is applied to the D input of a flip-flop 21 to control the direction of a stepper motor 22, which in turn controls the air/fuel mixture. A clock 23 produces pulses at a 60 Hz rate at output 24 to clock the flip-flop 21. The flip-flop 21 thus changes to a state indicated by the comparator 20 and its Q output is applied to the direction input on a stepper motor control 25. The stepper motor control 25 is a commercially available integrated circuit which also receives 30 Hz pulses from the clock 23. It produces signals for a stepper motor driver circuit 26 which cause the stepper motor 22 to advance one step for each 30 Hz clock pulse in the direction indicated by the state of flip-flop 21. The circuits 25 and 26 employed in the preferred embodiment are available from SGS-Thomson Microelectronics as the L297 stepper motor controller and the L293 push-pull four channel drivers respectively.

If the measured oxygen level in the engine exhaust drops below the reference level 19, the stepper motor 22 is advanced in steps to decrease the amount of fuel in the air/fuel mixture input to the engine. On the other hand, if the measured oxygen level increases over the reference level 19, the state of the flip-flop 21 is changed and the stepper motor 22 is rotated in the opposite direction to increase the fuel intake. Under steady state conditions, the stepper motor 22 is toggled back and forth about the setting which provides the desired amount of oxygen in the engine exhaust. For a more detailed description of the stepping motor 22 and how it is physically mounted to control an engine valve, reference is made to U.S. Pat. No. 5,033,433 which is owned by the assignee of the present application and which is incorporated herein by reference.

Referring still to FIG. 1, because the emissions level of the engine is controlled by the stepper motor 22, it is important that the system work properly at all times when the engine is operating. To insure that the system is operating properly, a fault detector circuit 30 monitors the measured oxygen level signal 18. When a malfunction is detected, the fault detector circuit 30 produces a fault indicate signal at an output 31. This signal energizes a fault indicate light 32 and it triggers a triac 33 which short circuits the engine ignition line 34 to circuit ground. As will be described in more detail below, when a fault is indicated, the engine is shut down for a minimum time period of 20 to 25 seconds and the light 32 is energized during that time period to notify the operator of the reason for the shut down.

Figure 2:
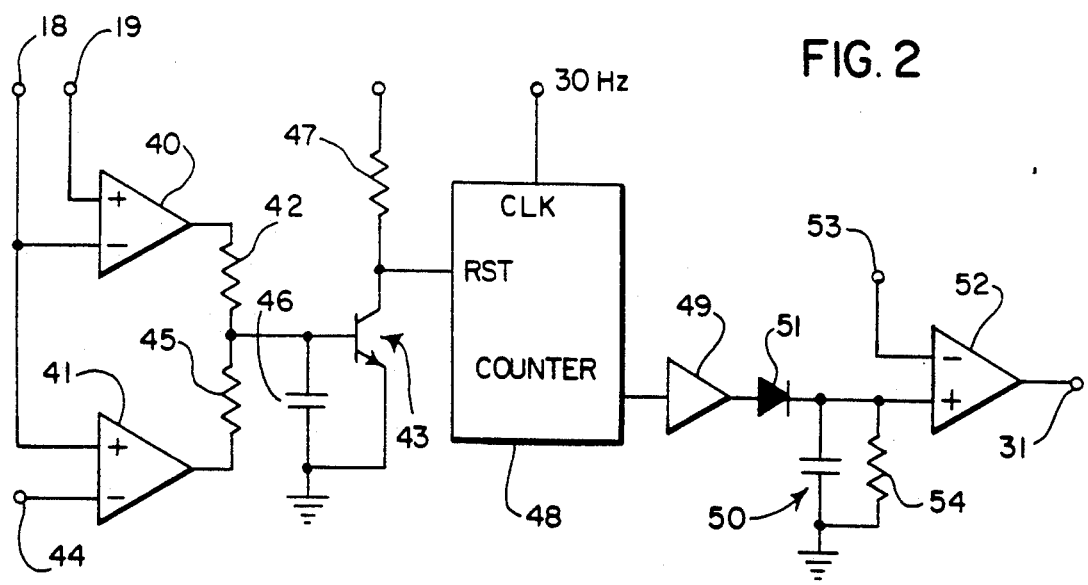
FIG. 2 is a schematic diagram of the fault detector circuit which forms part of the system of FIG. 1.

Referring particularly to FIG. 2, the fault detector circuit 30 includes a pair of comparator circuits 40 and 41 which connect to receive the oxygen level signal 18. The comparator 40 also receives the reference level signal 19 and its output is coupled through a resister 42 to the base of a transistor 43. A high oxygen level reference signal is produced at 44 and applied to the second input on the comparator circuit 41. The output of comparator circuit 41 also connects to the base of transistor 43 through a second coupling resistor 45, and a capacitor 46 connects the transistor base to circuit ground. The collector of transistor 43 is pulled to a logic high voltage by resistor 47, and the collector connects to the reset input of a 12-bit binary counter 48.

As long as the measured oxygen level signal 18 remains above the reference level signal 19 and below the high oxygen level signal 44, the transistor 43 remains off and the reset input to counter 48 remains at a logic high voltage. As a result, the counter 48 is continuously reset to zero and it does not accumulate any counts despite the application of 30 Hz clock pulses to its input. However, if the measured oxygen level signal 18 remains outside the range established by the reference signals 19 and 44, the transistor 43 is turned on and the counter reset terminal is pulled to a logic low voltage. As a result, the binary counter begins accumulating counts at the 30 Hz clock rate. If either condition continues for 60 seconds, a logic high voltage is produced at the most significant digital output of the counter 48 to indicate a fault. This signal is applied through buffer 49 to charge a capacitor 50 through diode 51. The capacitor 50 maintains a charge for 20 to 25 seconds, sufficient to produce a voltage at one input of a comparator 52 that exceeds a reference voltage applied to the comparator's other input 53. As a result, when the counter 48 indicates a fault, the output 31 of comparator 52 is driven to a fault indicating logic high voltage for a period of 20 to 25 seconds. This time interval is preset by the values of capacitor 50 and a bleeder resistor 54.

The emissions control system of the preferred embodiment will maintain the oxygen level in the exhaust at the reference level under normal operating conditions. If the control system should fail, however, the oxygen senor 10 will indicate an oxygen level outside the range determined by the reference voltages 19 and 44. If this condition continues for longer than one minute, the counter 48 "times out" and the fault indicate signal is produced at output 31 to shut down the engine and energize the light 32.

It can be appreciated by those skilled in the art that many variations can be made from the preferred embodiment of the invention without departing from the spirit of the invention. The preset time intervals and normal operating range will vary considerably depending on the engine size and application. Numerous exhaust gas sensors are commercially available and their characteristics will determine the particular amplifier gains and filter frequencies required.

I claim:

1. A system for controlling the air/fuel mixture input to an internal combustion engine which comprises:
   a sensor mounted to the engine for sensing the level of an exhaust gas and producing an analog signal indicative of that level;
   means for producing a reference level signal indicative of the desired level of said exhaust gas;

a comparator connected to receive the analog exhaust gas signal and the reference level signal and being operable to produce a first logic level output if the analog exhaust gas signal exceeds the reference level signal and produce a second logic level output if the analog exhaust gas signal is less than the reference level signal;

a clock for producing clock pulses;

a flip-flop connected to the comparator and the clock and being operable to store the state of the comparator output each time a clock pulse is received and to produce a corresponding direction signal at an output;

a stepper motor mounted to the engine for controlling the air/fuel mixture; and a stepper motor control connected to the clock and the flip-flop and being operable to advance the stepper motor one step for each received clock pulse in the direction indicated by the state of the flip-flop.

2. The system as recited in claim 1 which includes an averaging circuit connected between the sensor and the comparator.

3. The system as recited in claim 1 in which the measured gas is oxygen.

4. The system as recited in claim 1 which includes a fault detector connected to receive the analog exhaust gas signal and being operable to indicate a fault if that signal remains outside a preset range of values for a preset time interval.

5. The system as recited in claim 4 in which the fault detector includes:

comparator means for receiving the analog exhaust gas signal and producing a logic level signal which indicates if the level thereof is inside or outside of said preset range;

a counter connected to the clock and the comparator means and being operable to generate a fault indicate signal if the logic level signal indicates the analog exhaust gas signal is outside said preset range for longer than said preset time interval.

6. The system as recited in claim 5 in which the preset range is established by said reference level signal and a high oxygen level reference signal produced by said means for producing a reference signal.

7. The system as recited in claim 4 in which the fault detector includes means for stopping the engine for a shut down interval when a fault is indicated.

8. The system as recited in claim 7 in which the fault detector includes means for visually indicating a fault condition.

* * * * *